United States Patent
Lee et al.

(10) Patent No.: US 6,718,500 B1
(45) Date of Patent: Apr. 6, 2004

(54) RLP COMMUNICATION DEVICE AND METHOD FOR MOBILE COMMUNICATION SYSTEM

(75) Inventors: Hyun-Seok Lee, Seoul (KR); Hoon Chang, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/418,607

(22) Filed: Oct. 15, 1999

(30) Foreign Application Priority Data

Oct. 15, 1998 (KR) ........................................ 1998-43560

(51) Int. Cl.⁷ ................................................ H04L 1/18
(52) U.S. Cl. ........................................ 714/749; 714/746
(58) Field of Search ................................ 714/749, 746, 714/750

(56) References Cited

U.S. PATENT DOCUMENTS 5,793,744 A * 8/1998 Kanerva et al. ............ 370/209
5,920,576 A * 7/1999 Eaton et al. ................ 714/749

FOREIGN PATENT DOCUMENTS

| CA | 2301881 | 8/1998 |
| WO | WO 97/23073 | 6/1997 |

OTHER PUBLICATIONS

Canadian Office Action dated Feb. 3, 2003, issued in a counterpart application, namely, Appln. No. 2,314,250.

* cited by examiner

*Primary Examiner*—Phung M. Chung
(74) *Attorney, Agent, or Firm*—Dilworth & Barrese, LLP

(57) ABSTRACT

An RLP communication method for a mobile communication system. In the RLP communication method, an RLP layer transfers an information frame including information about a transmission side to a physical layer/multiplexing layer at set periods, when there is no data to transmit. The physical layer/multiplexing layer receives the information frame and transmits the received information frame to the other party over a physical channel.

18 Claims, 7 Drawing Sheets

RLP COMMUNICATION DEVICE AND METHOD FOR MOBILE COMMUNICATION SYSTEM

PRIORITY

This application claims priority to an application entitled "RLP Communication Device and Method for Mobile Communication System" filed in the Korean Industrial Property Office on Oct. 15, 1998 and assigned Ser. No. 98-43560, the contents of which are hereby incorporated by reference.

BACKGROUND OF THE INVENTION

1. Field of the Invention

The present invention relates generally to a CDMA (Code Division Multiple Access) mobile communication system, and in particular, to an RLP (Radio Link Protocol) communication device and method which supports a discontinuous transmission (DTX) mode for an effective data transmission in a radio environment.

2. Description of the Related Art

CDMA mobile communication systems have developed from the voice service-based IS-95 standard into the CDMA-2000 standard which provides not only voice service but also a high-speed data transmission service as well. For example, the CDMA-2000 standard provides high-quality voice service, moving picture service, Internet search service, etc. The existing voice service-based CDMA mobile communication system transmits data at a data rate of 9.6 Kbps or 14.4 Kbps, whereas the CDMA-2000 mobile communication system transmits data at a rate of up to 2 Mbps. Therefore, the CDMA-2000 system can transmit data over 138 times faster than the existing CDMA mobile communication system.

The CDMA mobile communication system uses a radio link protocol (RLP) to solve a data loss problem which occurs in a radio environment. The radio link protocol is based on a 20 ms frame at a data rate of below 9.6 or 14.4 Kbps, and an RLP Type 2 has been proposed.

The radio link protocol uses a NAK (Non-Acknowledge) method to limit data loss. A receiving side requests a transmission side to retransmit only the receiving-failed RLP frames. In this method, however, the receiving side does not know of the receiving failure for a specific frame until a frame having a sequence number higher than that of the receiving-failed frame is received.

Referring to FIG. 1, there is shown a case where only the fifth frame out of five frames transmitted from the transmission side has successfully arrived at the receiving side. Therefore, in FIG. 1, the receiving side cannot recognize the receiving failure for the first to fourth frames until the fifth frame is received.

As mentioned above, the radio link protocol uses the NAK method, so that the receiving side does not immediately recognize the receiving failure of a frame. Therefore, in the existing RLP Type 2, idle frames are used to solve the above problem. In RLP Type 2, the transmission side transmits an idle frame when there is no frame to transmit so as to inform the receiving side about the sequence number of the last transmitted data frame. That is, the transmission side constantly transmits frames, and if any one of the transmitted frames is received, the receiving side immediately knows which frame or frames it failed to receive. By using this method, the receiving side can determine a failed-receipt in a much shorter period of time.

Unfortunately, the constant transmission of idle frames overloads the system. Furthermore, unlike the IS-95 standard, the CDMA-2000 standard is not required to transmit frames continuously. It is therefore ineffective to use the method of transmitting the idle frames to solve the problem of the NAK method.

The RLP Type 2 proposes a method of using an idle timer and an idle transmission counter. In this method, the idle timer is set to a specific value when there is no data to be transmitted, and thereafter, when the idle timer becomes 0 (zero), the idle transmission counter is increased by one after transmitting one idle frame. Then, the idle timer is set again to the specific value, and thereafter, when the idle timer becomes 0, the idle transmission counter is increased by one after transmitting one idle frame. This operation is repeated until the idle transmission counter becomes 3, and then, transmission of the idle frames is discontinued. In this method, transmission of the idle frames is immediately discontinued when there is data to transmit; and after transmission was discontinued because the idle transmission counter became 3, transmission is not restarted until there is data to transmit.

The above method is advantageous because there is a reduction in the system load due to the idle timer. That is, in the RLP Type 2, when an RLP frame is receiving-failed, a blank frame is unconditionally made in a physical layer and a multiplexing layer of the receiving side. However, in this case, the radio link protocol does not know whether the radio link protocol of the transmission side failed to transmit the RLP frame because there is no data to transmit or there is data to transmit but there is no opportunity to transmit data because another service has a higher priority. In this case, it is determined in the RLP Type 2 that data was not transmitted because of the service having a higher priority and that there is data waiting to transmit. In other words, in the RLP Type 2, retransmission-related timers are not decreased, thus delaying transmission.

The CDMA-2000 standard provides a method for enabling the receiving side to recognize that the transmission side did not transmit data, whereby a transmission side of the physical layer transmits no physical channel frame. By using this above method, the radio link protocol can distinguish whether the radio link protocol of the transmission side either has no data to transmit or has low priority. It is therefore possible to facilitate a more accurate operation by using the function of the physical layer.

SUMMARY OF THE INVENTION

It is, therefore, an object of the present invention to provide a method in which a radio link protocol (RLP) can operate in an environment where periodic frame transmission is not guaranteed.

It is another object of the present invention to provide a method in which a physical layer of a receiving side informs a radio link protocol that no physical frame has been received.

It is further another object of the present invention to provide a method in which a transmission side can efficiently verify whether or not the last data in a continuous transmission duration is transmitted normally in a discontinuous transmission environment.

It is yet another object of the present invention to provide a method for decreasing a retransmission timer when data is not transmitted in a discontinuous transmission mode so as to ensure efficient retransmission.

It is still another object of the present invention to provide an improved RLP communication device and method for suppressing the transmission of idle frames when there in no data to transmit in a mobile communication system, thus reducing the system load.

It is still another object of the present invention to provide an improved RLP communication device and method for controlling the transmission of the idle frames according to a condition of the physical channel.

It is still another object of the present invention to provide an improved RLP communication device and method for transmitting a frame having control information other than idle frames, so as to obtain the same result as if idle frames were transmitted, thereby improving the performance.

It is a further object of the present invention to provide an improved RLP communication device and method for transmitting a frame with control information using an automatic repeat request (ARQ) function, to verify whether or not every frame has been correctly transmitted.

To achieve the above objects, there is provided an RLP communication method for a mobile communication system. In the RLP communication method, an RLP layer transfers an information frame including information about a transmission side to a physical layer/multiplexing layer at set periods when there is no data to transmit. The physical layer/multiplexing layer receives the information frame and transmits the received information frame to the other party over a physical channel.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

The invention comprises an interface between a radio link protocol and a physical channel and multiplexing device in order to suppress the transmission of idle frames when there is no data to transmit. In addition, the invention comprises a method for managing an idle timer and a retransmission timer using the described interface.

Figure 1:
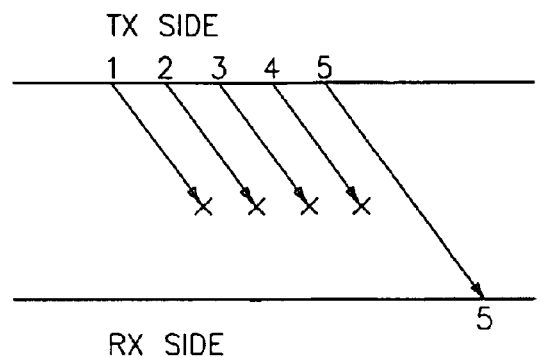
FIG. 1 is a diagram illustrating a method for exchanging a radio link protocol in a mobile communication system.
Figure 2:
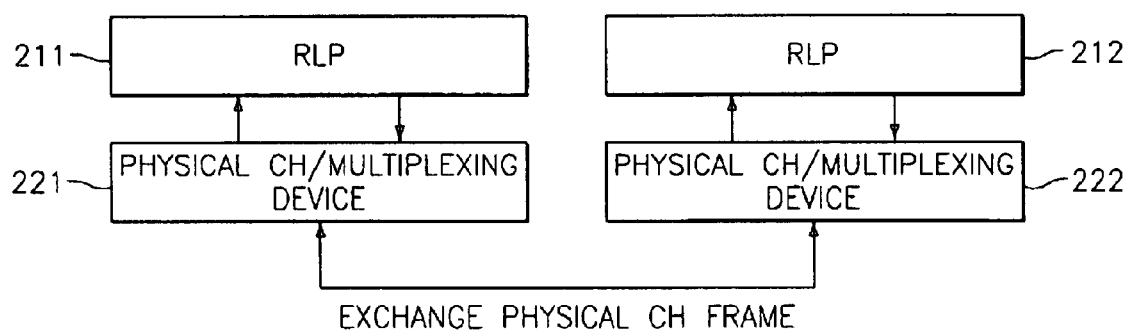
FIG. 2 is a diagram illustrating an interface between a radio link protocol and a physical channel and multiplexing device in a mobile communication system.

FIG. 2 shows an interface structure between a radio link protocol and a physical channel/multiplexing device. Referring to FIG. 2, there exists two radio link protocols 211 and 212 each exchanging RLP frames with their associated physical channel and multiplexing devices 221 and 222 respectively. Physical channel/multiplexing device 221 assembles RLP frames received from the upper radio link protocol 211 into one physical channel frame, and transmits the assembled physical channel frame to the other party. The other party's physical channel/multiplexing device 222 then disassembles the received physical channel frame into RLP frames, and provides the disassembled RLP frames to the upper radio link protocol 212. In the same process, the upper radio link protocol 212 can transmit an RLP frame to the other party's radio link protocol 211.

Tables 1 and 2 below each show an interface between the radio link protocol and the physical channel/multiplexing device, having the structure of FIG. 2. More specifically, Table 1 shows frames transmitted from the radio link to the physical channel/multiplexing device, and Table 2 shows frames transmitted from the physical channel/multiplexing device to the radio link protocol. In addition, the transmission frames in Tables 1 and 2 represent data or control RLP frames defined according to data rates in the RLP Type 2.

TABLE 1

| Frame Type | Meaning |
| --- | --- |
| Transmission Frame | General RLP Frame |
| Blank Frame | No Data to Transmit |

TABLE 2

| Frame Type | Meaning |
| --- | --- |
| Transmission Frame | General RLP Frame |
| Blank Frame | No RLP Frame to Receive |
| Erasure Frame | Abnormal Frame Received |
| Null Frame | No ACK Transmitted From Tx Side |

In Table 2, the null frame, which was not defined in the existing RLP Type 2, indicates that no physical frame has been received at the physical layer for a predetermined time (e.g., 20 ms). Here, the physical layer generates the null frame when the strength of a received signal is lower than a threshold for the predetermined time. A timer used in the operation of the radio link protocol using the above interface is decreased when the null frame is received and when the condition defined in the exiting RLP Type 2 occurs.

Now, an embodiment of the present invention will be described in detail with reference to the accompanying drawings.

In a radio link protocol having a discontinuous transmission property, there are two methods for determining whether the last frame in a data transmission duration has been transmitted normally or not.

First, the radio link protocol conventionally provides a blank frame or an idle frame to the physical channel/multiplexing device when there is data or control information to transmit. However, in the embodiment of the present invention, when there is no RLP frame to transmit, the radio link protocol provides only the blank frame, and non-periodically provides the idle frame to the physical channel/multiplexing device.

Figure 3:
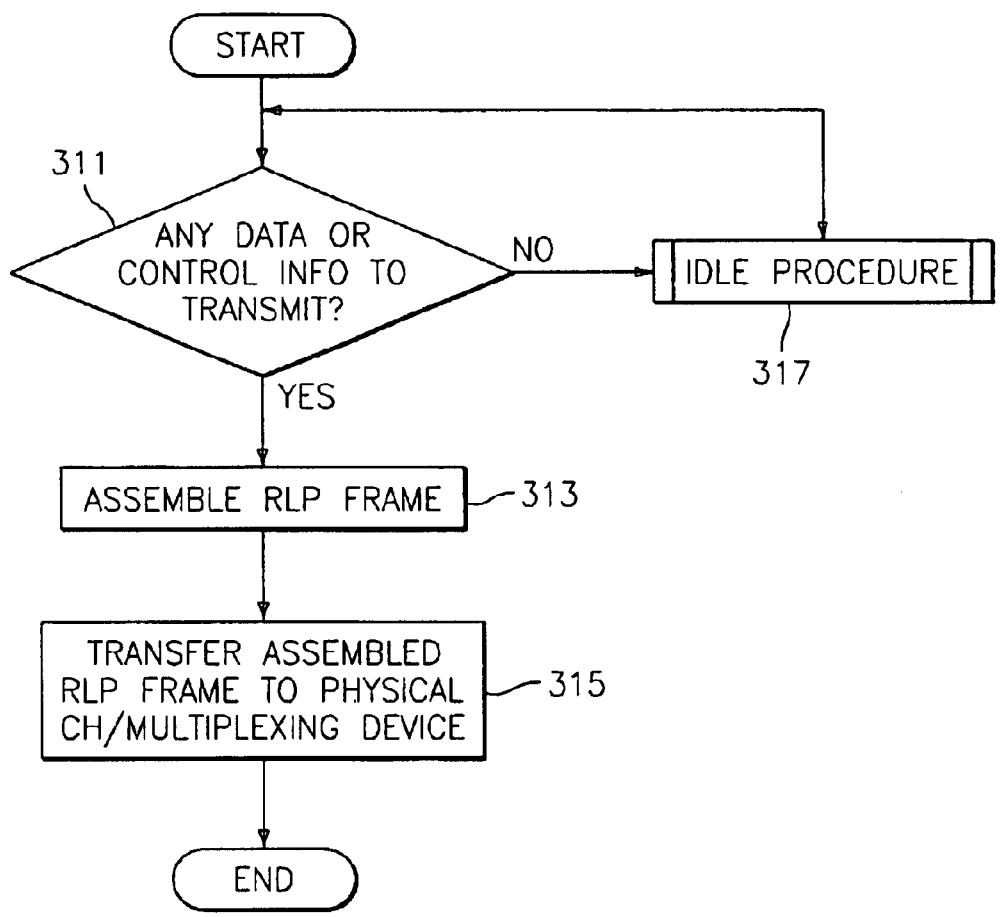
FIG. 3 is a flow chart illustrating a transmission procedure of a radio link protocol in a mobile communication system according to an embodiment of the present invention.

FIG. 3 shows a procedure performed by a radio link protocol when there is no data or control information to transmit, according to an embodiment of the present invention. Here, the radio link protocol performs the procedure of FIG. 3 when it is time to provide the frame to the physical channel/multiplexing device after a lapse of a predetermine time T (e.g., 20 ms).

Referring to FIG. 3, the radio link protocol determines in step 311 whether there is data or control information to transmit. When there is no data or control information to transmit, the radio link protocol performs an idle procedure in step 317. However, if there is data or control information to transmit, the radio link protocol assembles the proper RLP frames in step 313, and provides the RLP frames to the physical channel/multiplexing device in step 315. The physical channel/multiplexing device 315 then assembles the RLP frames provided from the radio link protocol into a physical frame, and transmits the physical channel to the other party.

Figure 4:
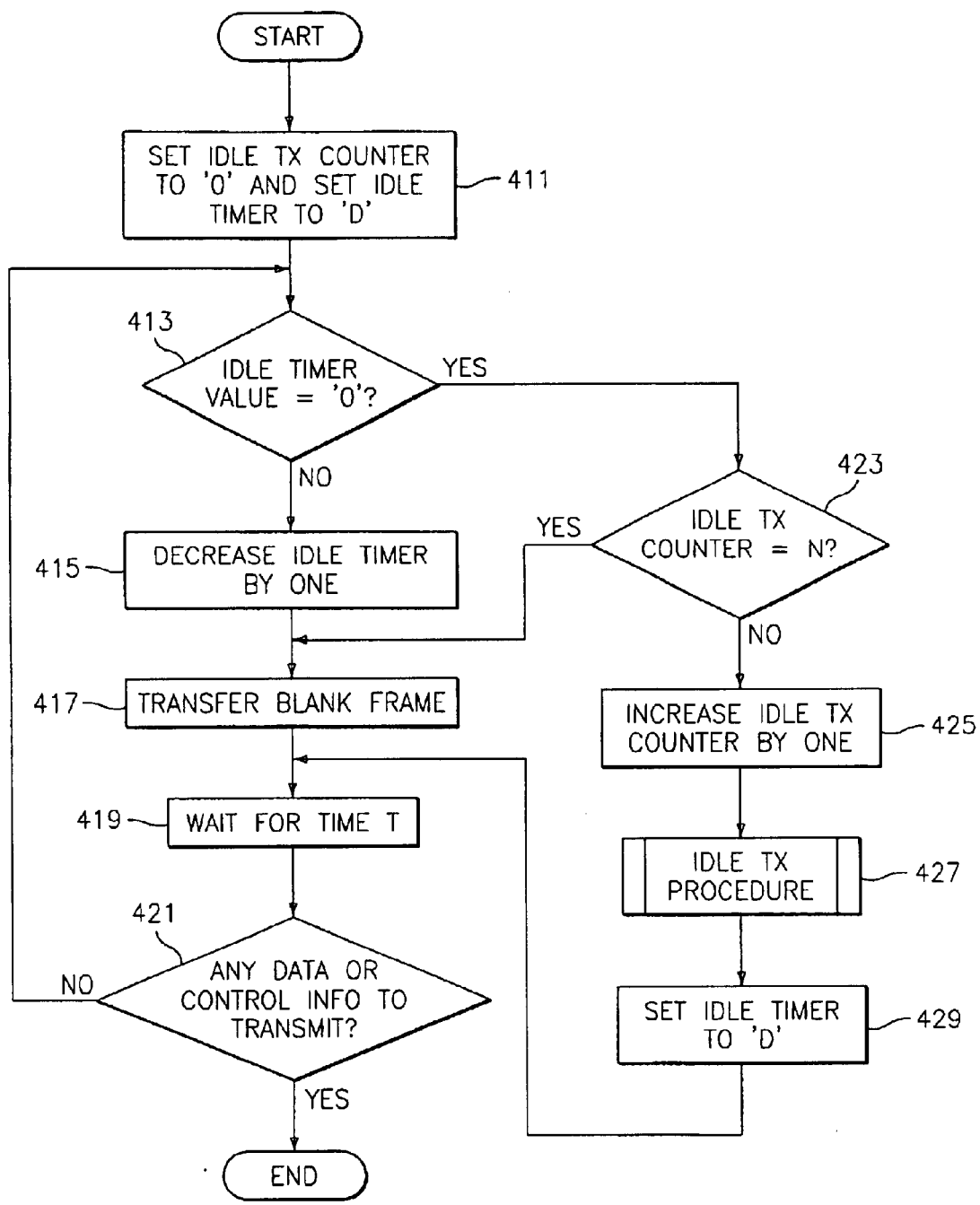
FIG. 4 is a flow chart illustrating an idle procedure of a radio link protocol in a mobile communication system according to an embodiment of the present invention.

The idle procedure performed in step 317 of FIG. 3 is illustrated in FIG. 4. The idle procedure defines how the radio link protocol operates when there is no frame to transmit.

Referring to FIG. 4, in step 411, the radio link protocol sets an idle transmission counter and an idle timer to 0 (zero) and an integer D, respectively. The idle transmission counter records how many idle, frames have been transmitted up to now, and the idle timer indicates a time when the next idle frame will be transmitted.

Thereafter, the radio link protocol determines in step 413 whether the idle timer has a value of 0. When the idle timer does not have a value 0, the radio link protocol decreases a value of the idle timer by one in step 415, and transmits a blank frame to the physical channel/multiplexing device to inform that there is no data or control information to transmit presently, in step 417. Thereafter, the radio link protocol waits for the predetermined time (T=20 ms) in step 419, and determines again in step 421 whether there is data or control information to transmit. If data or control information exists, the radio link protocol discontinues the idle procedure and returns to the procedure of FIG. 3. Otherwise, where no data or control information to transmit exists, the radio link protocol returns to step 413 to determine whether the idle timer has a value of 0.

When the idle timer is decreased to 0, the radio link protocol determines in step 423, whether the idle transmission counter has a predetermined value N. When the value of the idle transmission counter is not equal to the predetermined value N, the radio link protocol increases the idle transmission counter by one in step 425 and performs an idle transmission procedure for transmitting an idle frame or a control frame, in step 427. Thereafter, in step 429, the radio link protocol sets the idle timer to a proper value and then proceeds to step 419 to wait for the predetermined time T.

Here, the value to which the idle timer is set, can be a new value different from the previously set value.

When the value of the idle transmission counter is equal to the predetermined value N in step 423, the radio link protocol stops transmitting the idle frame or control frame and transmits only the blank frames until there is an RLP frame to transmit. That is, the radio link protocol proceeds to step 417 to transmit a blank frame. Thereafter, the radio link protocol waits for the predetermined time in step 419, and determines in step 421 whether there is data or control information to transmit. If there is data or control information to transmit, the radio link protocol returns to the procedure of FIG. 3 to generate and transmit an RLP frame. However, when there is no data or control information to transmit while waiting for the predetermined time, the radio link protocol returns to step 413.

In the idle procedure of FIG. 4, the radio link protocol can control the number of idle frames or control frames to be transmitted by previously setting the idle transmission counter to the value N. Further, in the idle procedure, the radio link protocol sets the idle timer to a proper value whenever newly setting the idle timer to the value D. It is therefore possible to control the waiting time before transmission of the idle frame or control frame.

Table 3 below shows values of the idle transmission counter and the idle timer, by way of example.

TABLE 3

| Idle Tx Counter (N) | Idle Timer (D) | Remarks |
| --- | --- | --- |
| α | 0 | Supported in Type 2 |
| 3 | Given Value | Supported in Type 2 |

As shown in Table 3, the two methods supported in the RLP Type 2 can be supported by the method proposed in the invention. That is, in order to increase the frequency of idle transmission to infinity, the N value is set to the infinite value and the idle timer is set to 0. The radio link protocol will then repeatedly transmit the idle frame or control frame, if there is no data or control information to transmit.

Furthermore, in Table 3, a method for limiting the frequency of idle transmission to 3 and setting the idle timer to a value given in the embodiment, is also proposed in the RLP Type 2. Therefore, by performing the procedure proposed in the invention, it is possible to support both of the two methods specified in the RLP Type 2.

Figure 5:
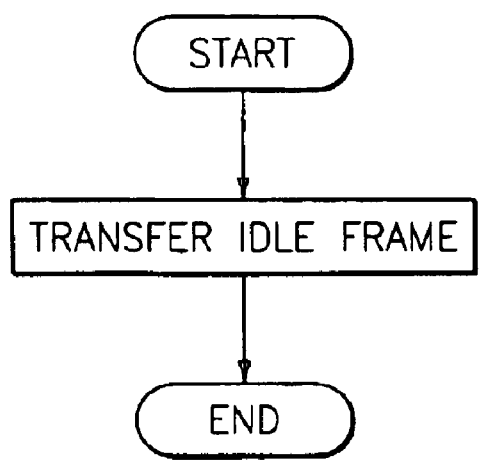
FIG. 5 is a flow chart illustrating an idle transmission procedure of a radio link protocol, for transmitting an idle frame in a mobile communication system according to an embodiment of the present invention.
Figure 6:
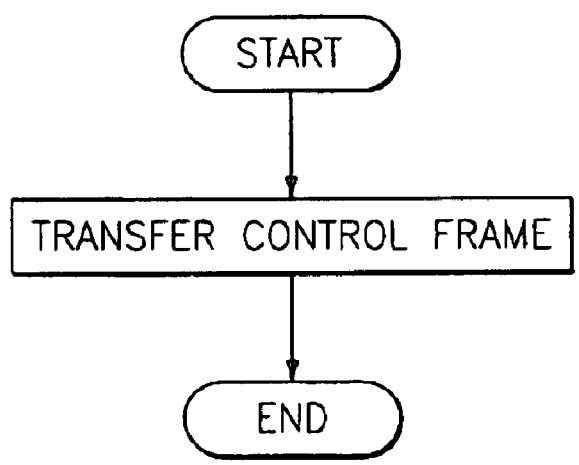
FIG. 6 is a flow chart illustrating an idle transmission procedure of a radio link protocol, for transmitting a control frame in a mobile communication system according to an embodiment of the present invention.
Figure 7:
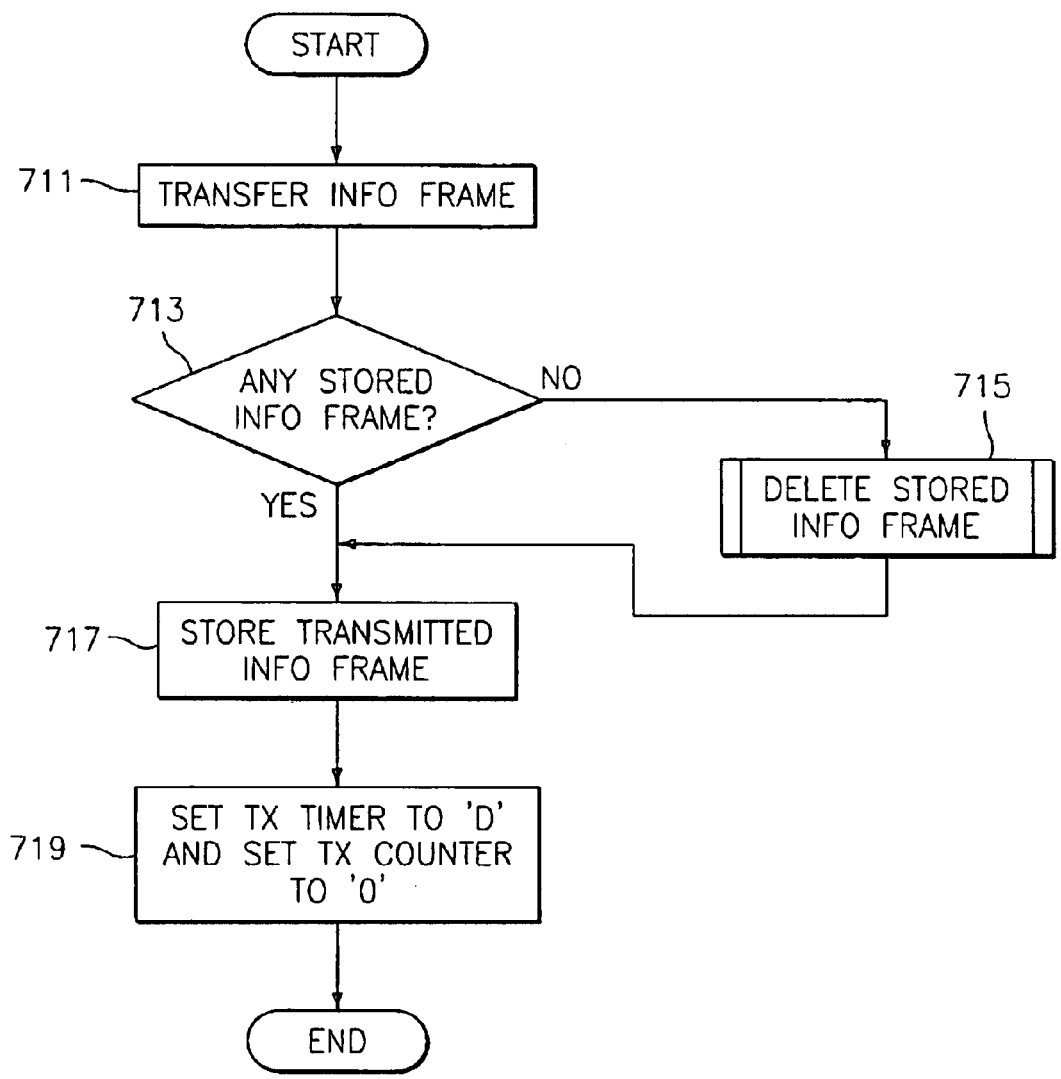
FIG. 7 is a flow chart illustrating an idle transmission procedure of a radio link protocol, for transmitting an information frame and waiting for a response to the transmitted information frame, in a mobile communication system according to an embodiment of the present invention.

The invention can exchange control information using the idle frame in order to ensure transmission of the last frame in a data transmission duration. The invention proposes three methods for the idle frame transmission procedure. Therefore, the radio link protocol of the transmission side can use any one of the above three idle transmission procedures. FIGS. 5 to 7 illustrate the idle transmission procedures according to an embodiment of the present invention.

FIG. 5 shows an idle transmission procedure where the radio link protocol transmits an idle frame to the physical channel/multiplexing device, and FIG. 6 shows an idle transmission procedure where the radio link protocol transmits a control frame to the physical channel/multiplexing device. For the control frame stated above, any control frame can be used which is defined in the radio link protocol.

The invention defines a new information frame for the control frame transmitted in the idle transmission procedure. Table 4 below shows the structure of the information frame proposed in the invention.

TABLE 4

| Field | Length (No of Bits) |
| --- | --- |
| Sequence Number | 8 |
| Control | 6 |
| L_SEQ_HI | 4 |
| ACK | 1 |

When ACK value is '1', an "ACK Sequence Number" field is followed.

| ACK Sequence Number | 12 |
| --- | --- |

The "ACK" or "ACK Sequence Number" field is followed by a "Count" field.

| Count | 2 |
| --- | --- |

Record fields are followed as many as (a number stored in the Count field)+1.

| Type | 4 |
| --- | --- |
| Type-Related Information | 16 |

As shown in Table 4, the lower 8 bits of the sequence number used in the radio link protocol are located at the head, and the control bits indicating the information frame are located next. The remaining part of the sequence number used in the radio link protocol is located next. The "ACK" field indicates a response to the information frame, and is transmitted from the other party. The "ACK" field has a value of '1' when a waiting information frame should respond to the information frame transmitted from the other party. Otherwise, the "ACK" field has a value of '0'. If the ACK value is '1', a 12-bit ACK sequence number follows. The ACK sequence number indicates that this information frame is an ACK frame for a certain information frame. If the ACK value is '0', this ACK sequence number is discarded. In addition, the "Count" field indicates how much information is included. It should be noted that the information has an amount corresponding to (the number stored in the count field)+1. Furthermore, the "Type" and "Type-Related Information" fields indicate the information to be transmitted by the information frame.

The invention proposes the "Type" and "Type-Related Information" fields, shown in Table 5 below.

TABLE 5

| Type | Information |
| --- | --- |
| 0000 | L_V(N) |
| 0001 | L_V(R) |
| 0010 | L_V(S) |

As shown in Table 5, the "Type" field is expressed by a binary number. With regard to the "Information" field, it is assumed that the 16 information bits. are filled starting from the lower bits and the remaining bits are filled with a '0'. Here, the type '0000' indicates an L_V(N) value defined in the RLP Type 2. The L_V(N) value indicates that all the RLP frames having a value lower than the above value have been received up to now. When this information is transmitted, the other party's radio link protocol can delete, from a buffer, an RLP frame having a value lower than the L_V(N) value. By transmitting the information, the radio link protocol can efficiently manage the buffer. Further, the type '0001' represents an L_V(R) value defined in the RLP Type 2. The L_V(R) value indicates that the RLP frame having a value lower than the above value has been received up to now. In addition, the type '0010' represents an L_V(S) value defined in the RLP Type 2. The L_V(S) value indicates that the RLP frame having a value lower than the above value has been transmitted up to now.

When the type and the type-related information are filled in the information frame of Table 4, it should be noted that self-information should be filled. That is, the information frame should always include the transmission party's information.

FIG. 7 shows an idle transmission procedure for setting a timer so that the information frame of Table 5 can be transmitted. Although the idle transmission procedure of FIG. 6 is completed by transmitting the information frame to the physical channel/multiplexing device, the idle transmission procedure of FIG. 7 further includes storing the transmitted information frame and setting a transmission timer and a transmission counter. If there exists a previously stored information frame, a newly transmitted information frame is stored after deleting the previously stored information frame. Here, it should be noted that the setting value of the transmission timer can be a new proper value different from the previous value.

Referring to FIG. 7, the radio link protocol transfers an information frame to the physical channel/multiplexing device in step 711 and determines in step 713 whether there is a stored information frame. When there is a stored information frame, the radio link protocol deletes the stored information frame in step 715 and proceeds to step 717. However, if there is no stored information frame, the radio link protocol stores the transmitted information frame in step 717. Thereafter, in step 719, the radio link protocol sets the transmission timer to a proper value and sets the transmission counter to '0', and returns to the idle procedure.

Figure 8:
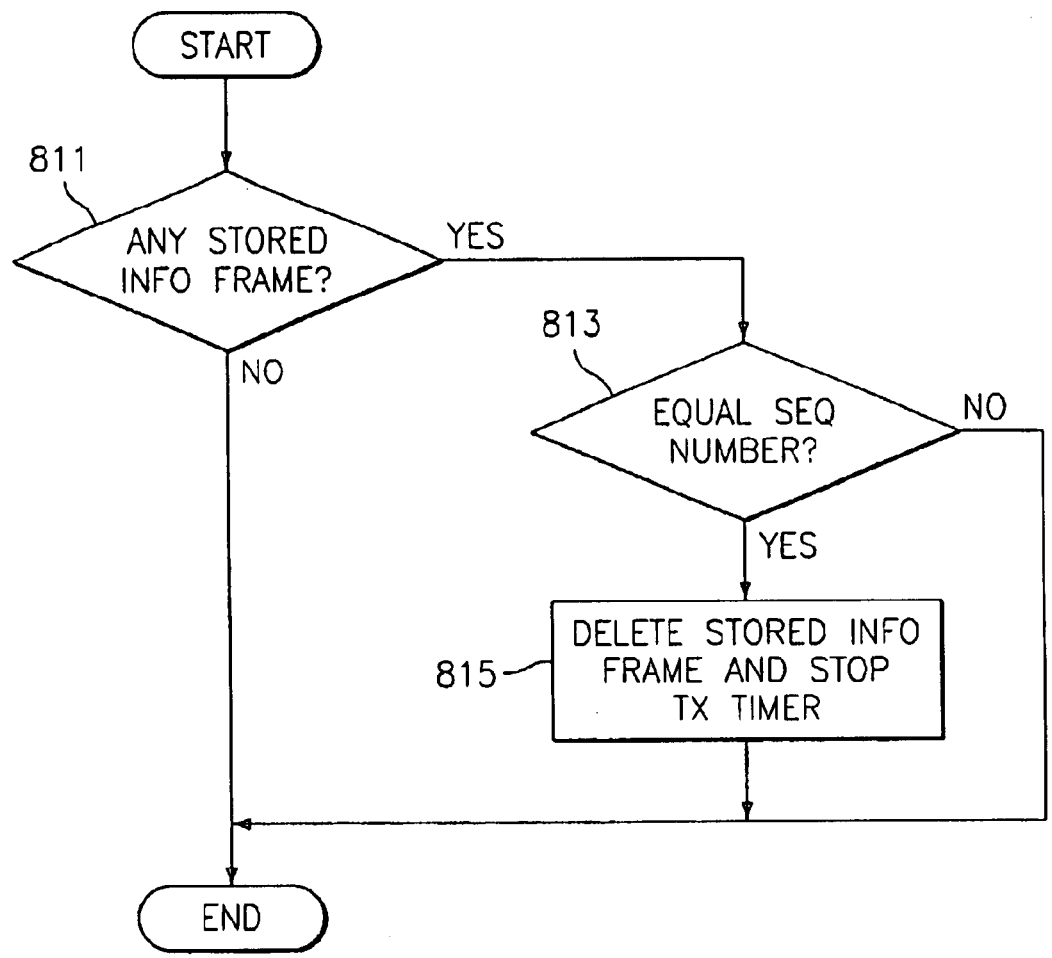
FIG. 8 is a flow chart illustrating an operating procedure of a radio link protocol upon receipt of an ACK information frame in a mobile communication system according to an embodiment of the present invention.

FIG. 8 shows how the radio link protocol operates upon receipt of an ACK information frame. Here, the ACK information frame refers to an information frame shown in Table 4, whose ACK field has a value of '1'.

Referring to FIG. 8, upon receipt of an ACK information frame, the radio link protocol determines in step 811, whether there exists a stored information frame. When there exists no stored information frame, the radio link protocol ends this procedure and then proceeds to an information frame processing procedure. However, when there exists a stored information frame, the radio link protocol determines in step 813 whether the received ACK information frame is an ACK information frame for the stored information frame by examining whether a sequence number of the ACK information frame is equal to a sequence number of the stored information frame. If the ACK information frame is different from the stored information frame in sequence number, the procedure is ended. However, when the ACK information frame is equal to the stored information frame in sequence number, the radio link protocol deletes the stored information frame and stops the transmission timer, in step 815. After completion of the above procedure, the radio link protocol proceeds to the information frame processing procedure.

Figure 9:
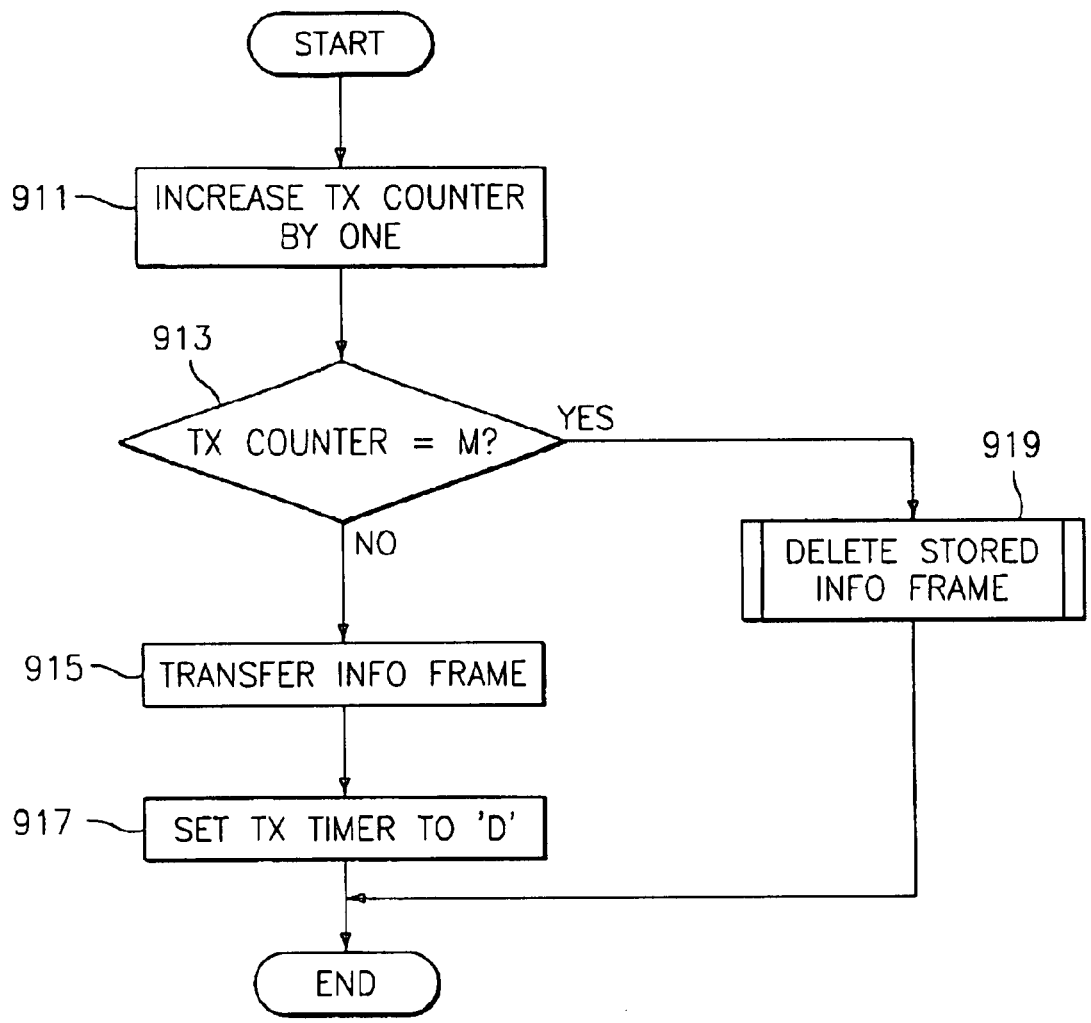
FIG. 9 is a flow chart illustrating an operating procedure of a radio link protocol upon the expiration of an information frame transmission timer in a mobile communication system according to an embodiment of the present invention.

FIG. 9 shows how the radio link protocol operates upon the expiration of the transmission timer. Referring to FIG. 9, the radio link protocol increases the transmission counter by one in step 911. Then, the radio link protocol determines in step 913 whether the increased value of the transmission counter is equal to a predetermined proper value M. If equal, the radio link protocol deletes the stored information frame and no longer transmits the information frame, in step 919. If not equal, the radio link protocol transfers the stored information frame to the physical channel/multiplexing device in step 915 and sets the transmission timer to a proper value in step 917. Here, it should be noted that the setting value of the transmission timer can be a new proper value different from the previous value.

Heretofore, a description has been made regarding the procedures performed in the radio link protocol of the transmission side. Now, a description will be made regarding the procedures performed in the radio link protocol of the receiving side.

The radio link protocol of the receiving side receives the frames shown in Table 2 from the physical channel/multiplexing device. In Table 2, the transmission frame represents RLP data or a control frame defined according to data rates in the RLP Type 2. The information frame specified in the invention is also included in the transmission frame.

The physical channel/multiplexing device transfers a blank frame to the radio link protocol, when a received physical channel frame does not have data to transmit to the radio link protocol. The physical channel/multiplexing device transfers an erasure frame to the radio link protocol when a received physical channel frame is in a bad condition. The physical channel/multiplexing device transfers a null frame to the radio link protocol when no physical channel frame is received.

The radio link protocol operates as defined in RLP Type 2, with regard to the transmission frame, blank frame and erasure frame received from the physical channel/multiplexing device.

The present invention proposes that with regard to the null frame, the radio link protocol operates as if an idle frame were virtually received. That is, upon receipt of the null frame from the physical channel/multiplexing device, the radio link protocol operates as if it received an idle frame. Therefore, the radio link protocol performs a NAK list processing procedure defined in the RLP Type 2 as if it received a normal idle frame. Here, when performing the NAK list processing procedure, the radio link protocol decreases both a retransmission timer and an abort timer defined in RLP Type 2. In this method, the receiving side can perform a proper operation, even though the transmission side does not transmit the idle frames.

As described above, the invention-provides a new interface, called a null frame, between a radio link protocol and a physical channel/multiplexing device. In addition, the present invention describes a new idle procedure, idle transmission procedure and information frame which contribute to the efficient transfer of data in the CDMA-2000 standard.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A radio link protocol (RLP) communication device for a mobile communication system, the communication device and communication system supporting a discontinuous transmission (DTX) mode, comprising:

an RLP layer for transferring an information frame including information about a transmission side to a physical layer/multiplexing layer at set periods, when there is no data to transmit; and the physical layer/multiplexing layer for receiving the information frame and transmitting the received information frame to the other party over a physical channel.

2. The RLP communication device as claimed in claim 1, wherein the RLP layer stores the information frame after transmission of the information frame, and retransmits the information frame when an ACK (Acknowledge) frame is not received in response to the transmitted information frame for a predetermined time.

3. The RLP communication device as claimed in claim 2, wherein upon receipt of an ACK frame, the RLP layer compares a sequence number of the stored information frame with a sequence number of the ACK frame, and deletes the stored information frame when the sequence numbers are equal to each other.

4. The RLP communication device as claimed in claim 1, wherein the information frame includes information L_V (N) indicating that all RLP frames whose sequence numbers precede a specific sequence number have been received.

5. The RLP communication device as claimed in claim 1, wherein the information frame includes information L_V (R) indicating that an RLP frame whose sequence number precedes a specific sequence number has been received.

6. The RLP communication device as claimed in claim 1, wherein the information frame includes information L_V (S) indicating that an RLP frame whose sequence number precedes a specific sequence number has been transmitted.

7. The RLP communication device as claimed in claim 1, wherein the information frame comprises:

a field for storing lower bits of a sequence number used in a radio link protocol;

a field indicating an information frame;

a field for storing remaining upper bits of the sequence number;

a field indicating an ACK frame;

a field for storing an ACK sequence number;

a field indicating an amount of information; and at least one field for storing information to be transmitted.

8. The RLP communication device as claimed in claim 1, wherein the set period is differently set every transmission of the information frame.

9. The RLP communication device as claimed in claim 1, wherein the RLP layer transfers blank frames to the physical layer/multiplexing layer at regular intervals for the set period.

10. An RLP communication method for a mobile communication system, the communication system supporting a discontinuous transmission (DTX) mode, comprising the steps of:

transferring, at an RLP layer, an information frame including information about a transmission side to a physical layer/multiplexing layer at set periods, when there is no data to transmit;

receiving, at the physical layer/multiplexing layer, the information frame; and transmitting the received information frame to the other party over a physical channel.

11. The RLP communication method as claimed in claim 10, wherein the RLP layer stores the information frame after transmission of the information frame, and retransmits the information frame when an ACK frame is not received in response to the transmitted information frame for a predetermined time.

12. The RLP communication method as claimed in claim 10, wherein upon receipt of an ACK frame, the RLP layer compares a sequence number of the stored information frame with a sequence number of the ACK frame, and deletes the stored information frame when the sequence numbers are equal to each other.

13. The RLP communication method as claimed in claim 10, wherein the information frame includes information L_V(N) indicating that all RLP frames whose sequence numbers precede a specific sequence number have been received.

14. The RLP communication method as claimed in claim 10, wherein the information frame includes information L_V(R) indicating that an RLP frame whose sequence number precedes a specific sequence number has been received.

15. The RLP communication method as claimed in claim 10, wherein the information frame includes information L_V(S) indicating that an RLP frame whose sequence number precedes a specific sequence number has been transmitted.

16. The RLP communication method as claimed in claim 10, wherein the information frame comprises:

a field for storing lower bits of a sequence number used in a radio link protocol;

a field indicating an information frame;

a field for storing remaining upper bits of the sequence number;

a field indicating an ACK frame;

a field for storing an ACK sequence number;

a field indicating an amount of information; and at least one field for storing information to be transmitted.

17. The RLP communication method as claimed in claim 10, wherein the set period is differently set every transmission of the information frame.

18. The RLP communication method as claimed in claim 10, wherein the RLP layer transfers blank frames to the physical layer/multiplexinglayer at regular intervals for the set period.

* * * * *